United States Patent
Wenz et al.

(10) Patent No.: US 7,446,144 B2
(45) Date of Patent: Nov. 4, 2008

(54) THERMOPLASTIC MOLDING COMPOSITION AND ARTICLES THERMOFORMED THEREFROM

(75) Inventors: Eckhard Wenz, Köln (DE); Pierre Moulinié, Leverkusen (DE); Thomas Eckel, Dormagen (DE); Vera Buchholz, Köln (DE); Dieter Wittmann, Leverkusen (DE); Bruce Hager, Canonsburg, PA (US); Fred J. Zaganiacz, Pittsburgh, PA (US)

(73) Assignees: Bayer MaterialScience LLC, Pittsburgh, PA (US); Bayer MaterialScience AG, Leverkusen (DE)

( * ) Notice: Subject to any disclaimer, the term of this patent is extended or adjusted under 35 U.S.C. 154(b) by 353 days.

(21) Appl. No.: 11/226,636

(22) Filed: Sep. 14, 2005

(65) Prior Publication Data

US 2007/0060678 A1    Mar. 15, 2007

(51) Int. Cl.
C08K 3/34       (2006.01)
C08K 5/521      (2006.01)
C08K 5/5399     (2006.01)

(52) U.S. Cl. .............. 524/451; 524/116; 524/122; 524/127; 524/138; 524/140; 524/141; 524/148

(58) Field of Classification Search .......... 524/116, 524/122, 127, 138, 140, 141, 148, 451
See application file for complete search history.

(56) References Cited

U.S. PATENT DOCUMENTS

| 5,061,745 | A | 10/1991 | Wittmann et al. | 524/139 |
| 5,204,394 | A | 4/1993 | Gosens et al. | 524/125 |
| 5,672,645 | A | 9/1997 | Eckel et al. | 524/127 |
| 5,849,827 | A | 12/1998 | Bödiger et al. | 521/423 |
| 6,448,316 | B1 | 9/2002 | Hirano et al. | 524/127 |
| 6,569,930 | B1 | 5/2003 | Eckel et al. | 524/127 |
| 6,727,301 | B1 | 4/2004 | Eckel et al. | 524/127 |
| 6,737,465 | B2 * | 5/2004 | Seidel et al. | 524/451 |
| 6,767,944 | B2 | 7/2004 | Zobel et al. | 524/127 |
| 6,828,366 | B2 | 12/2004 | Seidel et al. | 524/127 |
| 6,914,090 | B2 | 7/2005 | Seidel et al. | 524/127 |
| 7,186,767 | B2 * | 3/2007 | Seidel et al. | 524/127 |
| 2002/0161078 | A1 | 10/2002 | Zobel et al. | 524/115 |
| 2003/0083418 | A1 | 5/2003 | Warth et al. | 524/451 |
| 2003/0083419 | A1 * | 5/2003 | Seidel et al. | 524/451 |
| 2003/0092805 | A1 | 5/2003 | Seidel et al. | 524/127 |
| 2003/0105196 | A1 | 6/2003 | Seidel et al. | 524/127 |
| 2003/0109612 | A1 | 6/2003 | Seidel et al. | 524/115 |
| 2003/0191250 | A1 | 10/2003 | Seidel et al. | 525/538 |

FOREIGN PATENT DOCUMENTS

| DE | 19962930 | * | 6/2001 |
| DE | 10109224 | * | 9/2002 |
| DE | 10152318 | * | 5/2003 |
| DE | 10213431 | * | 10/2003 |
| DE | 10256316 | * | 6/2004 |
| WO | 99/57198 | | 11/1999 |

* cited by examiner

Primary Examiner—Peter Szekely
(74) Attorney, Agent, or Firm—John E. Mrozinski, Jr.

(57) ABSTRACT

A thermoplastic molding composition suitable for preparing articles by thermoforming is disclosed. The molding composition that comprise A) branched, aromatic poly(ester)carbonate, B) graft polymer, C) an optional vinyl(co)polymer and or polyalkylene terephthalate, D) at least one flame retarding phosphorous compound selected from the group consisting of mono- and oligomeric phosphorus and phosphonic acid esters, phosphonate amines and phosphazenes and E) talc, is characterized in that its flexural modulus at room temperature is at least 3000 N/mm$^2$ and that its falling dart energy at break, at −30° C., is at least 40.0 J. Sheets extruded of the composition are suitable for making useful articles by thermoforming.

15 Claims, No Drawings

THERMOPLASTIC MOLDING COMPOSITION AND ARTICLES THERMOFORMED THEREFROM

FIELD OF THE INVENTION

The invention is directed to a thermoplastic molding composition and to thermoformed articles made therefrom, and more particularly to articles thermoformed of a thermoplastic aromatic polycarbonate composition.

TECHNICAL BACKGROUND OF THE INVENTION

Impact-modified polycarbonate-molding compositions which are suitable for extrusion applications are known. EP-A 0 345 522 (U.S. Pat. No. 5,061,745) describes compositions containing aromatic polycarbonates, ABS-graft polymers and/or copolymers that contain styrene rendered fire-retardant by the incorporation of mono phosphoric acid esters. Corresponding compositions rendered flame retardant by the incorporation of oligo phosphoric acid ester or mixtures of oligo- and mono phosphoric acid esters have been disclosed in U.S. Pat. Nos. 5,204,394 and 5,672,645. Also relevant is the disclosure JP-A 111 997 68 of PC/ABS-mixtures that are made fire-retardant with the incorporation of monomer and oligomer phosphoric acid esters. The fire-retardance is improved distinctly by the inclusion of inorganic fillers, such as talc. The inclusion of inorganic filler adversely affects the mechanical properties, especially the toughness of polymer blends.

U.S. Pat. No. 5,849,827 and WO 99/07782 disclosed PC/ABS-molding compositions that are rendered fire-retardant by the inclusion of oligo phosphates based on resorcinol and on Bisphenol-A. The after-burning time periods are reported to be significantly reduced by adding small amounts of nano-scaled inorganic materials. The melt stability of these compositions is deemed insufficient for extrusion applications.

WO 99/57198 describes PC/ABS-molding compositions that are made fire-retardant by the incorporation of an oligo-phosphate derived from resorcinol and fluorinated polyolefin. Linear and branched polycarbonates having high molecular weights (31,000 and 32,000 g/mole) were used in these compositions. The rheological properties of these compositions (MVR) make these compositions suitable for extrusion. WO 01/66634 (corresponding to US2003092805) describes molding compositions that contain polycarbonate, an impact modifier and a halogen-free phosphorous flame-retardant and optional inorganic filler. These compositions are characterized by their combination of good fire-resistance and melt viscosity at 260° C. and a shear rate of 100 s$^{-1}$ to $\geq$600 Pas.

WO 00/58394 disclosed polycarbonate molding compositions containing graft polymers and oligo phosphate. WO 01/48074 disclosed compositions containing polycarbonate, impact modifier, phosphorous-containing fire-retardant and talc of high purity. WO 01/48087 describes compositions containing polycarbonate, impact modifier and talc having $Al_2O_3$-content of <1 weight %.

WO 01/66635 describes compositions containing polycarbonate, impact modifier and phosphorous fire-retardant. Extrusion-grade melt-stable, flame retardant, impact modified polycarbonate compositions that are suitable for thermoforming and articles made therefrom have not hitherto been disclosed.

To be suitable for use in e.g. the automotive industry, fire-resistant polycarbonate compositions need to combine high mechanical strength, including strength at low temperatures and exceptional fire-resistance.

An object of the invention therefore is the development of an impact-modified, fire-retardant extrusion-grade, thermoformable polycarbonate composition having good mechanical properties and surface quality.

SUMMARY OF THE INVENTION

A thermoplastic molding composition suitable for preparing articles by thermoforming is disclosed. The molding composition that comprise A) branched, aromatic poly(ester)carbonate, B) graft polymer, C) an optional vinyl(co)polymer and or polyalkylene terephthalate, D) at least one flame retarding phosphorous compound selected from the group consisting of monomeric phosphonic acid esters, monomeric phosphorus acid esters, oligomeric phosphonic acid esters, oligomeric phosphorus acid esters, phosphonate amines and phosphazenes and E) talc. In a preferred embodiment, the composition is characterized in that its flexural modulus at room temperature is at least 3000 N/mm$^2$ and that its falling dart energy at break, at –30° C., is at least 40.0 J, particularly preferably at least 50.0 J. Sheets extruded of the composition are suitable for making useful articles by thermoforming.

DETAILED DESCRIPTION OF THE INVENTION

The inventive thermoplastic molding composition comprise A) branched, aromatic poly(ester)carbonate, B) graft polymer, C) an optional vinyl(co)polymer and or polyalkylene terephthalate, D) at least one flame retarding phosphorous compound selected from the group consisting of monomeric phosphonic acid esters, monomeric phosphorus acid esters, oligomeric phosphonic acid esters, oligomeric phosphorus acid esters, phosphonate amines and phosphazenes and E) talc. Preferably the composition id characterized in that its flexural modulus at room temperature is at least 3000 N/mm$^2$ and that its falling dart energy at break, at –30° C., is at least 40.0 J particularly preferably at least 50.0 J the composition is suitable for making thermoformed articles.

In a preferred embodiment, the composition contains

A) 50 to 85, preferably 55 to 83, especially 60 to 78 parts by weight of branched, aromatic poly(ester)carbonate, B) 4 to 20, preferably 5 to 15, especially 6 to 12 parts by weight of graft polymer impact-modifier, C) 0 to 30, especially 0 to 25 parts by weight of vinyl(co) polymer and or polyalkylene terephthalate, D) 1 to 15, preferably 2 to 13, especially 3 to 11 parts by weight of at least one member selected from the group consisting of monomeric phosphonic acid esters, monomeric phosphorus acid esters, oligomeric phosphonic acid esters, oligomeric phosphorus acid esters, phosphonate amines and phosphazenes and E) 5 to 15, preferably 6 to 12, especially 7 to 12 parts by weight talc.

All parts by weight in the present context are normalized such that the total of all parts by weight of the components in the composition is 100.

Component A

Branched aromatic polycarbonates and/or aromatic polyester carbonates according to component A which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232

877, DE-A 2 703 376, DE-A 2 714 544, DE-A 3 000 610 and DE-A 3 832 396; for the preparation of aromatic polyester carbonates e.g. DE-A 3 077 934).

Aromatic polycarbonates are prepared e.g. by reaction of aromatic dihydroxy compounds, preferably diphenols, with carbonic acid halides, preferably phosgene, and/or with aromatic dicarboxylic acid dihalides, preferably benzenedicarboxylic acid dihalides, by the phase interface process, optionally using chain terminators, for example monophenols. The branching characterizing Component A of the present invention is attained by including in the reaction branching agents that are compounds having functionalities of three of more, for example triphenols or tetraphenols. Preparation via a melt transesterification process by reaction of diphenols with, for example, diphenyl carbonate is likewise possible.

Diphenols for the preparation of the aromatic polycarbonates and/or aromatic polyester carbonates are preferably those of the formula (I)

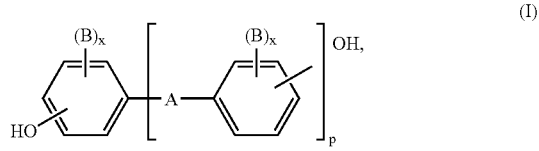

wherein
A is a single bond, $C_1$ to $C_5$-alkylene, $C_2$ to $C_5$-alkylidene, $C_5$ to $C_6$-cycloalkylidene, —O—, —SO—, —CO—, —S—, —$SO_2$—, $C_6$ to $C_{12}$-arylene, on to which further aromatic rings optionally containing heteroatoms may be fused, or a radical of the formula (II) or (III)

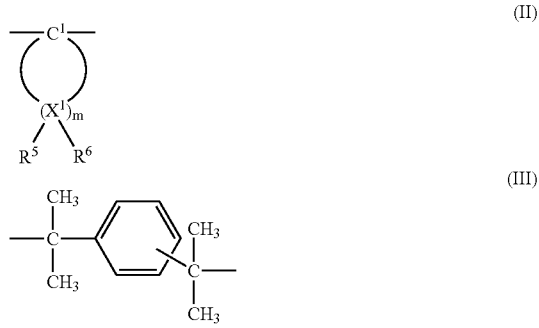

B in each case is $C_1$ to $C_{12}$-alkyl, preferably methyl, or halogen, preferably chlorine and/or bromine
x in each case independently of one another, is 0, 1 or 2,
p is 1 or 0, and
$R^5$ and $R^6$ independently for each $X^1$ and independently of one another denote hydrogen or $C_1$ to $C_6$-alkyl, preferably hydrogen, methyl or ethyl,
$X^1$ denotes carbon and
m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)-diisopropyl-benzenes, and derivatives thereof which are brominated on the nucleus and/or chlorinated on the nucleus.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols may be employed individually or as any desired mixtures. The diphenols are known from the literature or obtainable by known processes.

Chain terminators which are suitable for the preparation of the thermoplastic aromatic polycarbonates are, for example, phenol, p-chlorophenol, p-tert-butylphenol or 2,4,6-tribromophenol, and also long-chain alkylphenols, such as 4-[2-(2,4,4-trimethylpentyl)]-phenol according to DE-A 2 842 005, or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the total moles of the aromatic dihydroxy compounds employed.

The thermoplastic aromatic polycarbonates are branched in a known manner preferably by incorporation of 0.05 to 2.0 mol %, based on the total of the aromatic dihydroxy compounds employed, of compounds having functionalities of three or more, for example those having three and more phenolic groups.

Both homopolycarbonates and copolycarbonates are suitable. For the preparation of copolycarbonates according to the invention according to component A, it is also possible to employ 1 to 25 wt. %, preferably 2.5 to 25 wt. %, based on the total amount of aromatic dihydroxy compounds to be employed, of polydiorganosiloxanes having hydroxyaryloxy end groups. These are known (U.S. Pat. No. 3,419,634) and may be prepared by processes known from the literature. The preparation of polydiorganosiloxane-containing copolycarbonates is described in DE-A 3 334 782.

Preferred polycarbonates, in addition to the bisphenol A homopolycarbonates, are the copolycarbonates of bisphenol A with up to 15 mol %, based on the total moles of aromatic dihydroxy compounds, of other aromatic dihydroxy compounds mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are, preferably, the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic acid in a ratio of between 1:20 and 20:1 are particularly preferred. A carbonic acid halide, preferably phosgene, is additionally co-used as a bifunctional acid derivative in the preparation of polyester carbonates.

Suitable chain terminators for the preparation of the aromatic polyester carbonates are, in addition to the monophenols already mentioned, also chlorocarbonic acid esters thereof and the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides.

The amount of chain terminators is in each case 0.1 to 10 mol %, based on the moles of aromatic dihydroxy compounds in the case of the phenolic chain terminators and on the moles of dicarboxylic acid dichloride in the case of monocarboxylic acid chloride chain terminators. The aromatic polyester carbonates may also contain incorporated aromatic hydroxycarboxylic acids.

The aromatic polyestercarbonates are branched in a known manner (in this context, see DE-A 2 940 024 and DE-A 3 007 934). Suitable branching agents include carboxylic acid chlorides having functionalities of three or more, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed), or phenols having functionalities of three or more which may comprise functional groups such as amine groups. If the phenol comprises amine groups branching will occur by also forming amide bonds. Examples of phenols having a functionality of three or more are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, (1,1,1-tris(-hydroxyphenyl)ethane), isatinbiscresol or 1,4-bis-[4,4'-dihydroxytriphenyl)-methyl]-benzene, in amounts of 0.01 to 5 mol %, preferably 0.02 to 2 mol %, particular preferably 0.05 to 1 mol %, very particular preferably 0.1 to 0.5 mol %, based on the aromatic dihydroxy compounds employed. Phenolic branching agents may be initially introduced into the reaction mixture with the aromatic dihydroxy compounds, and acid chloride branching agents may be introduced together with the acid dichlorides.

The content of carbonate structural units in the thermoplastic aromatic polyester carbonates may be varied as desired. Preferably, the content of carbonate groups is a positive amount up to 100 mol %, in particular up to 80 mol %, particularly preferably up to 50 mol %, based on the total of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.2 to 1.5, preferably 1.24 to 1.4, particular preferably 1.25 to 1.35 (measured on solutions of 0.5 g polycarbonate or polyester carbonate in 100 ml methylene chloride at 25° C.).

The thermoplastic aromatic polycarbonates and polyester carbonates may be employed by themselves or in any desired mixture.

Component B

Component B is at least one graft polymers of

B.1 5 to 95, preferably 30 to 90 weight %, at least one vinyl monomer on

B.2 95 to 5, preferably 70 to 10 weight % of one or more graft base with glass transition temperatures <10° C., preferably <0° C., especially preferred <–20° C.

The graft base B.2 has, in general, a median particle size ($d_{50}$-value) of 0.05 to 10 μm, preferably 0.1 to 5 μm, especially preferred 0.2 to 1 μm.

Monomers B.1 are preferable mixtures of

B.1.1 50 to 99 weight parts of at least one monomer selected from the group consisting of vinylaromatics and vinylaromatics substituted on the nucleus (such as, for example, styrene, α-methylstyrene, p-methylstyrene or p-chlorostyrene) and/or methacrylic acid-($C_1$-$C_8$)-alkyl-ester, like methylmethacrylate, ethylmethacrylate, and B.1.2 1 to 50 weight parts of at least one monomer selected from the group consisting of vinyl cyanides (unsaturated nitriles, such as acrylonitrile and methacrylonitrile), (meth)acrylic acid ($C_1$-$C_8$)-alkyl esters (such as methyl methacrylate, n-butyl acrylate and tert-butyl acrylate) and derivatives of unsaturated carboxylic acids (such as anhydrides and imides, for example maleic anhydride and N-phenyl-maleimide).

Preferred monomers B.1.1 are selected from the group consisting of styrene, α-methyl styrene and methyl methacrylate, preferred monomers B.1.2 are selected from the group consisting of acrylonitrile, maleic acid anhydride and methyl methacrylate. Especially preferred monomers are B.1.1 styrene and B.1.2 acrylonitrile.

Suitable graft bases B.2 for the graft polymers include diene rubber, EP(D)M-rubber, such based on ethylene/propylene and optionally, diene, acrylate-, polyurethane-, silicon-, chloroprene and ethylene/vinyl acetate-rubber.

Preferred graft bases B.2 are diene rubber, based on butadiene and isoprene, or mixtures of diene rubbers or copolymerizates of diene rubbers or their mixtures with other copolymerizable monomers (such as the ones listed under B.1.1 and B.1.2), provided that the glass transition temperature of B.2 is <10° C., preferably <0° C., especially preferred <–10° C. Pure polybutadiene rubber is especially preferred.

Especially preferred polymerizates B include ABS-Polymerizates (emulsions-, mass- and suspensions-ABS), as described in for e.g. DE-OS 2 035 390 (=U.S. Pat. No. 3,644, 574) or in DE-OS 2 248 242 (=GB-PS 1 409 275) and also in Ullmanns, Encyclopaedia of Technical Chemistry, Vol. 19 (1980), Page 280 et seq. The gel content of the graft base B.2 is at least 30 weight %, preferably at least 40 weight % (measured in toluene).

The graft copolymerizates B are manufactured by radical polymerization, for example emulsion-, suspension-, solution- or mass polymerization, preferably by emulsion- or mass polymerization.

Graft rubbers that are especially suitable are ABS-polymerizates manufactured by redox-initiation with an initiator system made up of organic hydroperoxide and ascorbic acid according to U.S. Pat. No. 4,937,285.

Since the graft monomers are not necessarily grafted completely into the graft base in the graft reaction, the term graft polymerisate B also means products that were obtained by (co) polymerization of graft monomers in the presence of graft base and those that were obtained during processing.

Acrylate rubber suitable as graft base B.2 of polymer B include polymers of acrylic acid alkyl esters, optionally with up to 40 weight %, with respect to B.2 of other polymerizable, ethylenic unsaturated monomers. The preferred polymerizable acrylic acid ester is $C_1$ to $C_8$-alkylester. for example, methyl-, ethyl-, butyl-, n-octyl- and 2-ethylhexylester; halogenalkylester, preferably halogen-$C_1$-$C_8$-alkylester, like chlorethylcrylate and also mixtures of these monomers.

Monomers may be copolymerized with more than one polymerizable double bond for crosslinking. Preferred examples for cross-linking monomers are esters of unsaturated monocarboxylic acids with 3 to 8 C-atoms and unsaturated mono-valent alcohols with 3 to 12 C-atoms, or saturated polyols with 2 to 4 OH-groups and 2 to 20 C-atoms, like ethylene glycol dimethacrylate, allylmethacrylate; polyunsaturated heterocyclic compounds like trivinyl- and triallyl-cyanurate; poly-functional vinyl compounds like di- and trivinylbenzols; and also triallylphosphate and diallylphthalate. Preferred cross-linking monomers are allylmethacrylate, ethylene glycol dimethacrylate, diallylphthalate and heterocyclic compounds that have at least three ethylenic unsaturated groups. Especially preferred cross-linking monomers are the cyclic monomers of triallyl cyanurate, triallyl isocyanurate, triacryloyl hexahydro-s-triazine, trially benzols. The quantity of cross-linking monomers is preferably 0.02 to 5, especially 0.05 to 2 weight %, with respect to graft base B.2. It is advantageous to limit the quantity to below 1 weight % of graft base B.2 for cyclic cross-linking monomers with at least three ethylenic unsaturated groups.

Preferred "other" polymerizable, ethylenic unsaturated monomers that may be used for the manufacture of graft base B.2 along with acrylic acid esters include, acrylonitrile, styrene, α-methylstyrene, acrylamide, vinyl-$C_1$-$C_6$-alkylether, methylmethacrylate, and butadiene. Preferred acrylate rubber as graft base B.2 include emulsion polymers that have a gel content of at least 60 weight %.

Other suitable graft bases suitable as B.2 are silicon rubber with graft-active sites as described in DE-OS 3 704 657, DE-OS 3 704 655, DE-OS 3 631 540 and DE-OS 3 631 539.

The gel content of graft base B.2 is determined at 25° C. in a suitable solvent (M. Hoffmann, H. Krömer, R. Kuhn, Polymeranalytik I and II, Georg Thieme-publication, Stuttgart 1977).

The median particle size ($d_{50}$) is the diameter above and below which about 50 weight % of the particles lie. It may be determined by ultracentrifuge measurement (W. Scholtan, H. Lange, Kolloid, Z. and Z. Polymere 250 (1972), 782-1796).

Component C

The optional component C is a thermoplastic vinyl(co)polymer C.1 and/or polyalkyleneterephthalate C.2.

Suitable vinyl(co)polymer C.1 is the polymerization product of at least one monomer selected from the group consisting of vinyl aromatics, vinyl-cyanide (unsaturated nitrils), (meth)acrylic acid-(C1-C8)-alkyl-ester, unsaturated carbonic acid and also derivatives (such as anhydrides and imides) of unsaturated carbonic acids. Vinyl(co))polymers that are especially suited are made up of C.1.1 50 to 99, preferably 60 to 80 weight parts of vinyl aromatics and/or core-substituted vinyl aromatics (like styrene, α-methylstyrene, p-methylstyrene, p-chlorostyrene) and/or methacrylic acid-($C_1$-$C_8$)-alkyl-ester, like methylmethacrylate, ethyl methacrylate), and C.1.2 1 to 50, preferably 20 to 40 weight parts of vinyl cyanide (unsaturated nitriles such as acrylonitrile and methacrylonitrile) and/or (meth)acrylic acid-($C_1$-$C_8$)-alkyl ester, such as methyl methacrylate, n-butyl-acrylate, t-butyl-acrylate, and/or unsaturated carbonic acids like maleic acid and/or derivatives like anhydrides and imides, unsaturated carbonic acids, for example, maleic acid anhydride and N-Phenyl-maleinimide).

The vinyl(co)polymer C.1 is thermoplastic and rubber-free. The copolymer obtained from C.1.1 styrene and C.1.2 acrylonitrile is especially preferred.

The vinyl(co)polymersC.1 are known and may be manufactured by radical polymerization, especially by emulsion-, suspension-, solution- or mass polymerization. The (co)polymers have preferably molecular weights, Mw, (weight average, determined by light scattering or sedimentation) of 15,000 to 200,000. The polyalkyleneterephthalate of component C.2 is the reaction product obtained from aromatic dicarboxylic acid or its reactive derivatives, like dimethyl ester or anhydride, and aliphatic, cycloaliphatic or araliphatic diol.

Preferred polyalkyleneterephthalate contain at least 80, preferably at least 90 weight %, with respect to the dicarboxylic acid component terephthalic acid residue and at least 80 weight-%, preferably at least 90 mole-%, with respect to the diol component ethylene glycol- and/or butandiol-1,4- and/or propanediol-1,3-residues.

The preferred polyalkyleneterephthalate may contain, along with terephthalic acid residues, up to 20 mole-%, preferably up to 10 mole-%, residues of other aromatic or cycloaliphatic dicarboxylic acids with 8 to 14 C-atoms or aliphatic dicarboxylic acids with 4 to 12 C-atoms, like for e.g. residues of phthalic acid, isophthalic acid, naphthaline-2,6-dicarboxylic acid, 4,4'-diphenyldicarboxylic acid, succinic acid, adipic acid, sebacic acid, azelaic acid, cyclohexane diacetic acid.

The preferred polyalkyleneterepthalate may contain, along with ethylene glycol and also butandiol-1,4-residues, up to 20 mole-%, preferably up to 10 mole-%, other aliphatic diols with 3 to 12 C-atoms or cycloaliphatic diols with 6 to 21 C-atoms, for e.g. residues of propandiol-1,3, 2-ethylpropandiol-1,3, neopentylglycol, pentandiol-1,5, hexandiol-1,6, cyclohexan-dimethanol-1,4, 3-ethyl-pentandiol-2,4, 2-methylpentandiol-2,4, 2,2,4-trimethylpentandiol-1,3, 2-ethylhexandiol-1,3, 2,2-diethylpropandiol-1,3, hexandiol-2,5, 1,4-Di-(β-hydroxyethoxy)-benzol, 2,2-Bis-(4-hydroxycyclohexyl)-propane, 2,4-dihydroxy-1,1,3,3-tetramethyl-cyclobutane, 2,2-Bis-(4-β-hydroxyethoxy-phenyl)-propane and 2,2-Bis-(4-hydroxypropoxyphenyl)-propane (DE-A 2 407 674, 2 407 776, 2 715 932).

The polyalkyleneterephthalate may be branched by adding relatively smaller quantities of trifunctional or tetra functional alcohols or carboxylic acids, as disclosed in DE-A 1 900 270 and U.S. Pat. No. 3,692,744 incorporated herein by reference. Examples of preferred branching agents are trimesic acid, trimellitic acid, trimethylolethane and -propane and pentaerythritol.

Especially preferred are polyalkyleneterephthalate that were manufactured from terephthalic acid and its reactive derivatives (for e.g. its dialkyl esters) and ethylene glycol and/or butandiol-1,4, and mixtures of these polyalkyleneterepthalate.

Most preferred are mixtures of polyalkyleneterepthalate that contain 1 to 50 weight %, preferably 1 to 30 weight-%, polyethylene terephthalate and 50 to 99 weight-%, preferably 70 to 99 weight-%, polybutylene terephthalate.

The suitable polyalkylene terephthalates have, in general, a limiting viscosity number of 0.4 to 1.5 dl/g, preferably 0.5 to 1.2 dl/g, measured in phenol/o-dichlorbenzol (1:1 weight parts) at 25° C. in Ubbelohde-viscosimeter.

The suitable polyalkylene terephthalates are well known and are readily available in commerce. In the alternative they may be manufactured by known methods (refer for e.g. Kunstoffhandbuch, Vol. VIII, Pg. 695 onwards, Carl-Hanser-publication, Munich 1973). The vinyl(co)polymers or polyalkylene terephthalates may be present in quantities of 0 to 45, preferably 1 to 30 and especially preferred 2 to 25 pbw of the inventive composition.

Component D

Phosphorus-containing flame retardants for the purposes of the invention are preferably selected from the group consisting of monomeric phosphorus acid esters, monomeric phosphonic acid esters, oligomeric phosphorus acid esters, oligomeric phosphonic acid esters phosphonate amines and phosphazenes, wherein mixtures of several components selected from among one or more of these groups may also be used as flame retardants. Other halogen-free phosphorus compounds not given particular mention here may be used alone or in any desired combination with other halogen-free phosphorus compounds.

Preferred mono- and oligomeric phosphorus or phosphonic acid esters are phosphorus compounds of the general formula (IV)

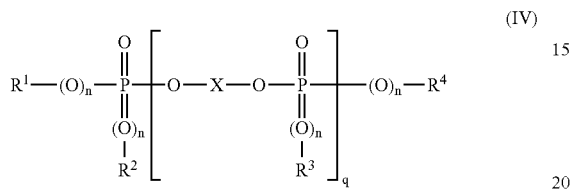

(IV)

in which
R$^1$, R$^2$, R$^3$ and R$^4$ mutually independently mean in each case optionally halogenated C$_1$ to C$_8$ alkyl, or C$_5$ to C$_6$ cycloalkyl, C$_6$ to C$_{20}$ aryl or C$_7$ to C$_{12}$ aralkyl in each case optionally substituted by alkyl, preferably C$_1$-C$_4$ alkyl, and/or halogen, preferably chlorine or bromine,
n mutually independently means 0 or 1, preferably 1,
q means 0 to 30, preferably 0.3 to 30, especially 0.5 to 10, especially 1.06 to 1.7 and
X means a mono- or polynuclear aromatic residue with 6 to 30 C atoms, or a linear or branched aliphatic residue with 2 to 30 C atoms, which may be OH-substituted and contain up to 8 ether bonds.
Preferably, R$^1$, R$^2$, R$^3$ and R$^4$ mutually independently denote C$_1$-C$_4$ alkyl, phenyl, naphthyl or phenyl-C$_1$-C$_4$-alkyl. The aromatic groups R$^1$, R$^2$, R$^3$ and R$^4$ may for their part be substituted with halogen and/or alkyl groups, preferably chlorine, bromine and/or C$_1$-C$_4$ alkyl. Particularly preferred aryl residues are cresyl, phenyl, xylenyl, propylphenyl or butylphenyl and the corresponding brominated and chlorinated derivatives thereof.
X in the formula (IV) preferably means a mono- or polynuclear aromatic residue with 6 to 30 C atoms.
X particularly preferably denotes

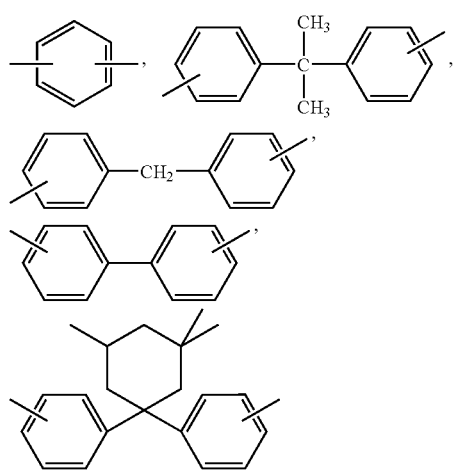

or the chlorinated or brominated derivatives thereof, in particular X is derived from

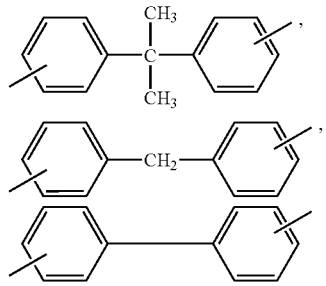

Particularly preferably, X is derived from, that is a residue of, bisphenol A.

The use of oligomeric phosphate esters of the formula (IV), which are derived from the bisphenol A, is particularly advantageous, since the compositions provided with this phosphorus compound exhibit particularly high stress cracking and hydrolysis resistance and a particularly low tendency to deposit formation during processing by injection molding. Moreover, particularly good heat resistance may be achieved with these flame retardants.

Mono-phosphorus compounds of the formula (IV) are in particular tri-butylphosphate, tris-(2-chloroethyl)phosphate, tris-(2,3-dibromopropyl)phosphate, triphenyl phosphate, tricresyl phosphate, diphenylcresyl phosphate, diphenyl-octyl phosphate, diphenyl-2-ethylcresyl phosphate, tri-(isopropylphenyl)phosphate, halosubstituted aryl phosphates, methylphosphonic acid dimethyl esters, methylphosphinous acid diphenyl esters, phenylphosphonic acid diethyl esters, triphenylphosphine oxide or tricresylphosphine oxide.

The phosphorus compounds according to formula (IV), are known (cf. for example EP-A 363 608, EP-A 640 655) or may be produced analogously in accordance with known methods (for example Ullmanns Enzyklopadie der technischen Chemie, Vol. 18, p. 301 ff. 1979; Houben-Weyl, Methoden der organischen Chemie, Vol. 12/1, p. 43; Beilstein Vol. 6, p. 177).

The average q-values may be determined in that the composition of the phosphate mixture (molecular weight distribution) is determined by means of suitable methods (gas chromatography (GC), high pressure liquid chromatography (HPLC), gel permeation chromatography (GPC) and the average values for q are calculated therefrom.

Also suitable are phosphonate amines conforming to formula (V)

(V)

in which
A denotes a residue of the formula (Va)

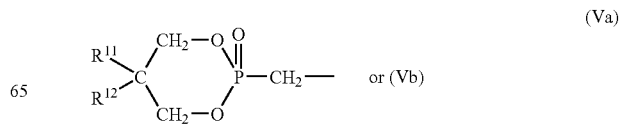

(Va) or (Vb)

-continued

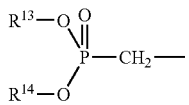
(Vb)

$R^{11}$ and $R^{12}$ mutually independently denote unsubstituted or substituted $C_1$-$C_{10}$ alkyl or unsubstituted or substituted $C_6$-$C_{10}$ aryl, $R^{13}$ and $R^{14}$ mutually independently denote unsubstituted or substituted $C_1$-$C_{10}$ alkyl or unsubstituted or substituted $C_6$-$C_{10}$ aryl or $R^{13}$ and $R^{14}$ together denote unsubstituted or substituted $C_3$-$C_{10}$ alkylene, y means the number values 0, 1 or 2 and B1 independently denotes hydrogen, optionally halogenated $C_2$-$C_8$ alkyl, unsubstituted or substituted $C_6$-$C_{10}$ aryl.

B1 preferably independently denotes hydrogen, ethyl, n- or iso-propyl, which may be halosubstituted, $C_6$-$C_{10}$ aryl, in particular phenyl or naphthyl, which is unsubstituted or substituted by $C_1$-$C_4$ alkyl and/or halosubstituted.

Alkyl in $R^{11}$, $R^{12}$, $R^{13}$ and $R^{14}$ independently preferably denotes methyl, ethyl, n-propyl, iso-propyl, n-, iso-, sec. or tert. butyl, pentyl or hexyl.

Substituted alkyl in $R^{11}$, $R^{12}$, $R^{13}$ and $R^{14}$ independently preferably denotes halosubstituted $C_1$-$C_{10}$ alkyl, in particular mono- or disubstituted methyl, ethyl, n-propyl, iso-propyl, n-, iso-, sec. or tert.-butyl, pentyl or hexyl.

$C_6$-$C_{10}$ aryl independently preferably denotes in $R^{11}$, $R^{12}$, $R^{13}$ and $R^{14}$ phenyl, naphthyl or binaphthyl, in particular o-phenyl, o-naphthyl, o-binaphthyl, which may be (in general mono-, di- or tri-) halosubstituted.

$R^{13}$ and $R^{14}$ may form a ring structure together with the oxygen atoms, to which they are directly attached, and the phosphorus atom.

The following are stated by way of example and as being preferred: 5,5,5',5',5'',5''-hexamethyl tris(1,3,2-dioxaphosphorinane-methane)amino-2,2',2''-trioxide of the formula (Va-1)

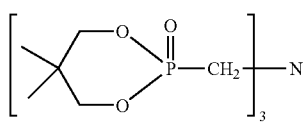
(Va-1)

(Trial product XPM 1000, Solutia Inc., St. Louis, USA)

1,3,2-dioxaphosphorinane 2-methaneamine, N-butyl-N[(5,5-dimethyl-1,3,2-dioxaphosphorinan-2-yl)-methyl]-5,5-dimethyl-, P,2-dioxide; 1,3,2-dioxaphosphorinane 2-methaneamine, N-[[(5,5-dimethyl-1,3,2-dioxaphosphorinan-2-yl) methyl]-5,5-dimethyl-N-phenyl-, P,2-dioxide; 1,3,2-dioxaphosphorinane 2-methaneamine, N,N-dibutyl-5,5-dimethyl-, 2-oxide, 1,3,2-dioxaphosphorinane 2-methaneimine, N-[(5,5-dimethyl-1,3,2-dioxaphosphorinan-2-yl)methyl]-N-ethyl-5,5-dimethyl-, P,2-dioxide, 1,3,2-dioxaphosphorinane 2-methaneamine, N-butyl-N-[(5,5-dichloromethyl-1,3,2-dioxaphosphorinan-2-yl)-methyl]-5,5-dichloromethyl-, P,2-dioxide, 1,3,2-dioxaphosphorinane 2-methaneamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane 2-methaneamine, N,N-di-(4-chlorobutyl)-5,5-dimethyl-2-oxide; 1,3,2-dioxaphosphorinane 2-methaneimine, N-[(5,5-dimethyl-1,3,2-dioxaphosphorinan-2-yl)methane]-N-(2-chloroethyl)-5,5-di(chloromethyl)-, P2-dioxide.

Also preferred are:

compounds of the formula (Va-2) or (Va-3)

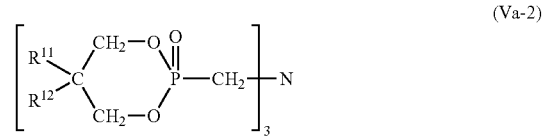
(Va-2)

(Va-3)

wherein $R^{11}$, $R^{12}$, $R^{13}$ and $R^{14}$ have the above-stated meanings.

Compounds of the formula (Va-2) and (Va-1) are particularly preferred.

Production of the phosphonate amines is described for example in U.S. Pat. No. 5,844,028.

Phosphazenes are compounds of the formula (VIa) and (VIb)

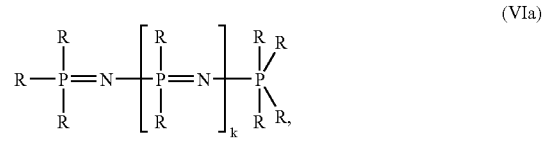
(VIa)

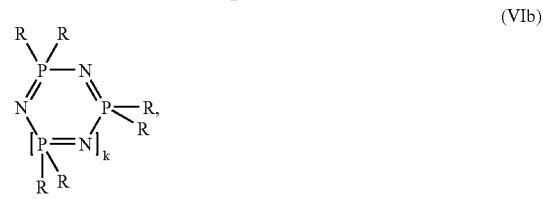
(VIb)

in which

R is in each case identical or different and denotes amino, in each case optionally halogenated, preferably fluorinated $C_1$ to $C_8$ alkyl or $C_1$ to $C_8$ alkoxy, or $C_5$ to $C_6$ cycloalkyl, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$-$C_4$-alkyl, in each case optionally substituted by alkyl, preferably $C_1$-$C_4$ alkyl, and/or halogen, preferably chlorine and/or bromine, k denotes 0 or a number from 1 to 15, preferably a number from 1 to 10.

Examples which may be mentioned are:

Propoxyphosphazene, phenoxyphosphazene, methylphenoxyphosphazene, aminophosphazene and fluoroalkylphosphazene.

Phenoxyphosphazene is preferred.

The phosphazenes may be used alone or as a mixture. The residue R may always be identical or 2 or more residues in the formula (VIa) and (VIb) may be different.

Phosphazenes and the production thereof are described for example in EP-A 728 811, DE-A 1 961668 and WO 97/40092.

The flame retardants may be used alone or in any desired mixture or in a mixture with other flame retardants.

Component E

Suitable talc is either naturally existing or synthetically manufactured talc.

Pure talc (3 MgO.4SiO$_2$.H$_2$O) contains 31.9 percent by weight (wt. %) MgO, 63.4 wt. % SiO$_2$ and 4.8 wt. % chemically bound water. It is a silicate with layered structure.

Naturally existing talcum materials do not, in general, have the above mentioned ideal composition since they become impure due to partial exchange of magnesium by other elements, by partial exchange of silicon, by for instance aluminum and/or due to mixing with other materials such as dolomite, magnesite and chlorite Talc having high purity, characterized by a MgO-content of 28 to 35 weight-%, preferably 30 to 33 weight-%, especially preferred 30.5 to 32 weight-% and SiO$_2$-content of 55 to 65 weight-%, preferably 58 to 64 weight-%, especially preferred 60 to 62.5 weight-% is preferred. Most preferred talc types are characterized in Al$_2$O$_3$-content of lesser than 5 weight %, especially preferred less than 1 weight %, especially less than 0.7 weight %.

Commercially available types of talc that have the described purity include Luzenac A3, A7, A10, A30 and Luzenac Prever M30 available from Luzenac Naintsch Mineral works GmbH (Graz, Austria) and Finntalc MO5SL, MO3 and M20SL available from Omya GmbH (Cologne). Not included are Luzenac SE-Standard, Luzenac SE-Super, Luzenac SE-Micro and Luzenac ST 10, 15, 20, 30 and 60. It is especially advantageous to use the talc in the form of a finely powdered type with a median particle size (d$_{50}$) of <20 μm, preferably <10 μm, especially preferred. <5 μm, most preferred <2,5 μm. An improved (notched) impact strength is achieved by using such fine talc without which the remaining properties (fire-resistance, stiffness, flow characteristics, stress crack resistance, etc.) could be adversely effected.

The talc may be surface-treated, for instance silanized, in order to improve its compatibility with the polymer matrix.

Conventional Additives F

The flame retardants corresponding to Component D are often used in combination with fluorinated polyolefins as anti-dripping agents, preferably in amounts of less than 3 wt. %, particular preferably 0.01 to 1 wt. % relative to the weight of the composition. Fluorinated polyolefins are known and described for example in EP-A 0 640 655. An example of a suitable commercial product is Teflon® 30 N of the firm DuPont.

The fluorinated polyolefins may be used both in pure form and in the form of a coagulated mixture of emulsions of the fluorinated polyolefins with emulsions of graft polymers or with an emulsion of a copolymer, preferably based on styrene/acrylonitrile or PMMA, wherein the fluorinated polyolefin is mixed as an emulsion with an emulsion of the graft polymer or of the copolymer and then coagulated.

Furthermore, the fluorinated polyolefins may be used as a pre-compound with the graft polymer (Component B) or with the optional copolymer of Component C, preferably based on styrene/acrylonitrile or PMMA. The fluorinated polyolefins are mixed as a powder with a powder or granules of the graft polymer or copolymer and melt-compounded in general at temperatures of 200 to 330° C. in conventional units such as internal mixers, extruders or twin screw extruders.

The fluorinated polyolefins may also be used in the form of a masterbatch, which is produced by emulsion polymerization of at least one monoethylenically unsaturated monomer in the presence of an aqueous dispersion of the fluorinated polyolefin. Preferred monomer components are styrene, acrylonitrile, methyl methacrylate and mixtures thereof. The polymer is used as a flowable powder after acidic precipitation and subsequent drying.

The coagulates, precompounds or masterbatches conventionally have solids contents of fluorinated polyolefin of from 5 to 95 wt. %, preferably 7 to 60 wt. %.

The fluorinated polyolefins may be used in concentrations of 0 to 1 part by weight, preferably of 0.1 to 0.5 parts by weight, in particular 0.2 to 0.5 parts by weight relative to the weight of the composition.

The compositions suitable in the context of the invention may also contain at least one conventional functional additive selected from the group consisting of mold release agent, for example pentaerythritol tetrastearate, a nucleating agent, antistatic agent, a thermal stabilizer, UV stabilizer, a further flame retardant or a conventional flame-retardant synergist, dye and pigment.

Also optionally included are inorganic materials in fine powder form. Suitable finest inorganic powders are made up of preferably at least one polar compound of one or more metals of first to fifth main group or first to eighth auxiliary group of the period table, preferably second to fifth main group or fourth to eighth auxiliary group, especially preferred are the third to fifth main group or fourth to eighth auxiliary group, or made up of compounds of these metals with at least one element chosen from oxygen, hydrogen, sulphur, phosphor, boron, carbon, nitrogen or silicon.

Preferred compounds include oxides, hydroxides, aqueous oxides, sulphates, sulphites, sulphides, carbonate, carbide, nitrate, nitrite, nitride, borate, silicate, phosphate, hydride, phosphite or phosphonate.

Included within the preferred compounds are TiO$_2$, SiO$_2$, SnO$_2$, ZnO, ZnS, Boehmite, ZrO$_2$, Al$_2$O$_3$, Aluminum phosphate, iron oxide, TiN, WC, AlO(OH), Fe$_2$O$_3$, NaSO$_4$, Vanadium oxide, zinc borate, Al-silicate, Mg-silicate. These, including nano-scaled powders, may be surface-modified with organic molecules in order to achieve better compatibility with the polymer matrix. Particularly preferred are hydrated aluminium oxides or TiO$_2$. The particle diameter of nano-particles is smaller than 200 nm, preferably smaller than 150 nm, especially 1 to 100 nm.

Particle size and particle diameter always mean the median particle diameter (d$_{50}$) determined by ultracentrifuge measurements according to W. Scholtan et al., Kolloid-Z. and Z. Polymere 250 (1972), Pg. 782-796.

The inorganic powder is incorporated in the thermoplastic mold in quantities of 0.5 to 40, preferably 1 to 25, especially preferred from 2 to 15 weight %, with respect to the thermoplastic material.

The powders may be incorporated into the thermoplastic molding composition following conventional procedures, such as direct kneading or extrusion. The composition in accordance with the invention is manufactured in the known way and are melt-compounded and melt-extruded at temperatures of 200° C. to 300° C. using conventional manufacturing equipment.

The mixing of individual components may take place successively or simultaneously, at temperatures of at least 20° C.

The thermoplastic compositions are suitable for the preparation of thermoformed articles because of their combined flame retardance, especially of short afterburning time, good mechanical properties at low temperatures high heat distortion temperatures and most importantly, high flexural modulus at room temperature that is at least 3000 N/mm$^2$ and falling dart energy at break, at −30° C., that is at least 40.0 J, preferably at least 50.0 J. The composition may first be extruded to sheets and the sheet then thermoformed to obtain the inventive article.

Thermoforming procedures are described for e.g. by G. Burkhardt et al. ("Plastics, Processing", in Ullmann's Encyclopedia of Industrial Chemistry, Wiley-VCH publication GmbH & Co. KgaA, 2002), or in Römpp Lexikon der Chemie, Georg Thieme Publication Stuttgart, 1999. Thermoforming refers to processes in which plastic sheet is heated and molded under heat, pressure or vacuum into three-dimensional articles. The well recognized process for thermoforming extruded sheet of polymeric material has been described in the literature—see for instance U.S. Pat. Nos. 3,931,383; 4,086,045; 4,105,386; 4,127,631; 5,175,198; 5,507,999; 5,380,481 and 6,086,800 all incorporated herein by reference. The extruded sheet may be processed in a deep drawing procedure at surface temperatures of 150° C. to 210° C., preferably 160° C. to 200° C.

Prefereably the process for the manufacture of the thermoformed article comprises (i) obtaining a thermoplastic molding composition in the molten state that contains A) branched. aromatic poly(ester)carbonate, B) graft polymer, C) an optional vinyl(co)polymer and or polyalkylene terephthalate, D) at least one flame retarding phosphorous compound selected from the group consisting of mono- and oligomeric phosphorous and phosphonic acid esters, phosphonate amines and phosphazenes and E) talc, said composition characterized in that its flexural modulus at room temperature is at least 3000 N/mm² and that its falling dart energy at break, at −30° C., is at least 40.0 J, preferably at least 50.0 J, (ii) extruding, the composition to obtain a sheet, and (iii) thermoforming the sheet into an article of manufacture.

Thermoformed articles made in accordance with the invention are suitable for the following applications: vehicle parts or interior work parts for motor cars, busses, trucks, caravans, railcars, airplanes, ships or other vehicles, caps for the construction sector, flat wall elements, partitions, protective strips for walls and edges, profiles for electronic installation channels, cable wires, bus bar covers, window and door profiles, furniture parts and road signs. The thermoformed articles are especially suitable as vehicle parts or interior work parts for cars, buses, trucks and caravans, recreational vehicle fenders shirts, tank covers, luggage doors, ground effects, end caps, aftermarket ground effects, bumper covers, running boards, rear and front bumper extenders, interior truck panels, counters, table tops and storage containers used by airlines, trains or ship.

EXAMPLES

The following materials were used in carrying out experiments demonstrating the invention.

Component A1

Branched polycarbonate based on bisphenol A having relative solution viscosity of $\eta rel=1.34$, (measured in $CH_2Cl_2$ as solvent at 25° C. and a concentration of 0.5 g/100 ml.) branched by isatinbiscresol (0.3 mole-% of isatinbiscresol with respect to the sum of bisphenol A and isatinbiscresol.

Component A2

Linear homopolycarbonate based on bisphenol A having relative solution viscosity of $\eta rel=1.28$ (measured in $CH_2Cl_2$ as solvent at 25° C. and a concentration of 0.5 g/100 ml.)

Component B

Graft polymer of 43 pbw styrene/acrylonitrile copolymer (at a weight ratio of 73:27) grafted on to 57 pbw of polybutadiene rubber, manufactured by emulsion-polymerization (median particle diameter=0.3-0.4 μm).

Component D1

Oligophosphate conforming to

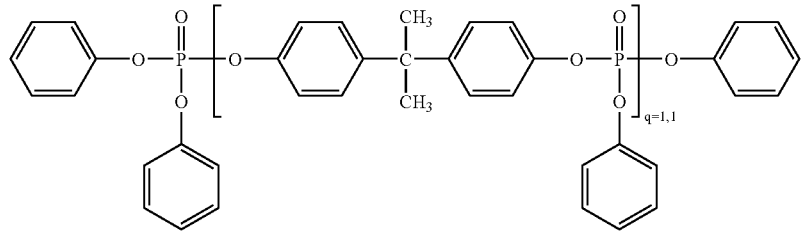

Component E

Luzenac A3C, Talc from Luzenac Naintsch Mineralwerke GmbH. MgO-content 32 wt %, $SiO_2$-content 61 wt % and $Al_2O_3$-content of 0.3 wt. %.

Component F1

Blendex® 449: Teflon-master batch from Chemtura containing 50 weight % of styrene-acrylonitrile copolymer and 50 weight-% of PTFE.

Component F2

Pentaerythritol tetrastearate as lubricant/mold release agent

Component F3

Phosphite stabilizer

Manufacture and Testing of the Inventive Articles i) Manufacture of the Composition The materials listed in Table 1 were compounded and granulated on a twin-screw extruder (ZSK-25) at a speed of 225 rpm at a throughput of 20 kg/h at 260° C.

ii) Evaluations of the Composition

The composition referred to in (i) in pellet-form was used in molding test specimens by injection molding (Arburg 270 E) (mass temperature 260° C., tool temperature 80° C., flow front speed of 240 mm/s).

The determination of notched impact strength ($a_K$) was according to ISO 180/1 A and falling dart energy at break was determined according to DIN EN ISO 6603-2. The flexural modulus was determined according to DIN EN ISO 178 and the tensile modulus was determined according to DIN EN ISO 527. The determination of heat resistance (Vicat softening temperature, method B with 50 N load) was according to DIN 53 460 (ISO 306) on specimens measuring 80 mm×10 mm×4 mm. The melt viscosity was determined according to ISO 11443. The thermoplastic free-flow (melt volume flow rate) (MVR) was determined according to DIN EN ISO 1133. Flammability tests were performed in accordance with UL 94 V.

iii) Extrusion of the Composition into Sheets

The composition referred to in (i) in pellet-form was extruded into sheets of 1.5 mm thickness on a sheet and foil extruder (Breyer, Singen, Germany; machine type Breyer 60) at 275° C. melt temperature and at a throughput of 100 kg/h. The surface quality of the extruded sheets was determined visually.

iv) Thermoforming and Evaluation of the Inventive Article

The suitability of the composition for thermoforming of articles (thermoformability) has been demonstrated by the preparation of deep-drawn pyramids using standard thermoforming equipment with a surface temperature control (Illig UA100/ED). The extruded sheets were cut into plates of 39 cm×50 cm and were deep-drawn at 195° C. surface temperature. As mold, a 6-step pyramide was used that was heated to 80° C. using a contact plate. The elements of the pyramide have the following dimensions: 25.3 cm×18.7 cm×3 cm; 22.3 cm×15.7 cm×3 cm; 19.3 cm×12.7 cm×3 cm; 16.3 cm×9.7 cm×3 cm; 13.3 cm×6.7 cm×3 cm; 10.3 cm×3.7 cm×3 cm.

The quality of the surface of the thermoformed articles was determined visually (determination of fractures at the outer corners and of the edge cracks).

Each of the compositions presented below contained, in addition to the indicated components 0.2 wt % of the PTFE master batch (F1), 0.2 wt. % of a mold release agent (F2) and 0.1 wt. % of a phosphite stabilizer (F3).

Comp.—denotes a comparison example

1: A denoted no defects; B denotes slight upper surface streaks at right angle to the extrusion direction; C denotes slight upper surface streaks at right angle to the extrusion direction and pits 1 to 2 mm in diameter at the lower surface, and D denotes slight upper surface streaks along the extrusion direction and dot-like defects on the upper surface.

What is claimed is:

1. A thermoformed article of manufacture comprising
    A) 50 to 85 pbw of at least one member selected from a group consisting of branched aromatic polycarbonate and branched aromatic polyester-carbonate,
    B) 4 to 20 pbw of at least one graft polymer,
    C) 0 to 30 pbw of at least one member selected from a group consisting of vinyl (co)polymer and polyalkylene terephthalate,
    D) 1 to 15 pbw of at least one member selected from the group consisting of monomeric phosphonic acid esters, monomeric phosphorus acid esters, oligomeric phosphonic acid esters, oligomeric phosphorus acid esters, phosphonate amines and phosphazenes, and
    E) 5 to 15 of talc,
    wherein component A contains at least one residue of an amine-functional branching agent, said composition characterized in that its flexural modulus at room temperature is at least 3000 N/mm$^2$ and that its falling dart energy at break, at −30° C., is at least 40.0 J.

2. The article of claim 1 wherein the composition contains 55 to 83 pbw of said A), 5 to 15 pbw of said B), 0 to 25 pbw of said C), 2 to 13 pbw of said D), and 6 to 12 pbw of said E).

3. The article of claim 1 wherein the composition contains 60 to 78 pbw of said A), 6 to 12 pbw of said B), 0 to 25 pbw of said C), 3 to 11 pbw of said D), and 7 to 12 pbw of said E).

4. The article of claim 1 wherein component D conforms structurally to formula (IV),

|  | 1 | 2 | 3- Comp | 4- Comp | 5- Comp | 6- Comp |
|---|---|---|---|---|---|---|
| COMPONENTS (parts by weight) | | | | | | |
| BRANCHED POLYCARBONATE (A1) | 76.7 | 72.7 | 62.8 | 62.7 | 82.7 | 0 |
| LINEAR POLYCARBONATE (A2) | 0 | 0 | 0 | 0 | 0 | 72.7 |
| GRAFT POLYMER B | 6.7 | 6.7 | 6.7 | 6.7 | 6.7 | 6.7 |
| OLIGOPHOSPHATE D | 6.1 | 10.1 | 20 | 10.1 | 10.1 | 10.1 |
| TALC, E | 10 | 10 | 10 | 20 | 0 | 10 |
| PROPERTIES | | | | | | |
| IMPACT STRENGTH, AT 23° C., kJ/mm$^2$ | 30.4 | 14.1 | 6.7 | 5.9 | 55.7 | 9.9 |
| AT −30° C. kJ/mm$^2$ | 12.1 | 9.1 | 5.7 | 5.8 | 15.9 | 8.2 |
| FALLING DART, ENERGY AT BREAK, AT 23° C., J | 49.5 | 49.0 | 44.3 | 21.9 | 48.3 | 47.4 |
| FALLING DART, ENERGY AT BREAK, AT −30° C., J | 54.3 | 53.4 | 10.7 | 3.8 | 53.2 | 51.7 |
| FLEXURAL MODULUS, N/mm$^2$ | 3828 | 3936 | 4104 | 5572 | 2561 | 3824 |
| TENSILE MODULUS, N/mm$^2$ | 3744 | 3970 | 4204 | 5568 | 2524 | 3798 |
| VICAT B 120, ° C. | 123 | 111 | 85 | 107 | 112 | 109 |
| MELT VISCOSITY AT 160° C./100 S$^{-1}$, Pa · s | 1141 | 930 | 332 | 565 | 1027 | 486 |
| MELT VISCOSITY AT 160° C./1000 S$^{-1}$, Pa · s | 463 | 352 | 154 | 244 | 382 | 249 |
| MELT VISCOSITY AT 160° C./1500 S$^{-1}$, Pa · s | 358 | 274 | 128 | 198 | 300 | 206 |
| MVR (260° C./5 Kg), ml/10 min | 6.6 | 11.0 | 47.9 | 20.3 | 9.8 | 31.6 |
| UL 94 V (3.0 mm)/AFT, CLASS/S | V0/12 | V0/9 | V0/1 | V0/19 | V0/8 | V0/4 |
| SURFACE QUALITY[1] | A | A | C | B | A | D |
| THERMOFORMED ARTICLES; FRACTURE AT THE OUTER CORNERS, % | 0 | 0 | 100 | 100 | 0 | 100 |
| THERMOFORMED ARTICLES; EDGE CRACKS, % | 0 | 0 | 0 | 33 | 0 | 33 |

$$R^1-(O)_n-\overset{\overset{O}{\|}}{\underset{\underset{R^2}{|}}{\underset{(O)_n}{P}}}\left[-O-X-O-\overset{\overset{O}{\|}}{\underset{\underset{R^3}{|}}{\underset{(O)_n}{P}}}\right]_q(O)_n-R^4 \quad (IV)$$

in which
- $R^1$, $R^2$, $R^3$ and $R^4$ mutually independently denote $C_1$ to $C_8$ alkyl, $C_5$ to $C_6$ cycloalkyl, $C_6$ to $C_{20}$ aryl or $C_7$ to $C_{12}$ aralkyl in each case optionally substituted by halogen or alkyl radicals,
- n mutually independently means 0 or 1,
- q means 0 to 30 and
- X denotes a mono- or polynuclear aromatic residue with 6 to 30 C atoms, or a linear or branched aliphatic residue with 2 to 30 C atoms.

5. The thermoformed article according to claim 1 wherein the graft polymer (B) is made up of
- B.1) 5 to 95 weight % of the polymerization product of one or more vinyl monomers on
- B.2) 95 to 5 weight-% of one or more graft bases having glass transition temperatures lower than 10° C., said weight % both occurrences relative to the weight of said graft polymer.

6. The thermoformed article according to claim 4, wherein X denotes the residue of bisphenol A.

7. The thermoformed article of claim 1 further containing at least one member selected from the group consisting of fluorinated polyolefins, of mold release agent, nucleating agent, antistatic agent, thermal stabilizer, UV stabilizer, dye and pigment.

8. The thermoformed article according to claim 1 further containing at least one nano-scaled powder selected from the group consisting of $TiO_2$, $SiO_2$, $SnO_2$, ZnO, ZnS, Boehmite, $ZrO_2$, $Al_2O_3$, Aluminum phosphate, iron oxide, TiN, WC, AlO (OH), $Fe_2O_3$, $NaSO_4$, Vanadium oxide, zinc borate, Al-silicate and Mg-silicate.

9. A thermoplastic molding composition comprising
- A) 50 to 85 pbw of at least one member selected from a group consisting of branched aromatic polycarbonate and branched aromatic polyester-carbonate said member containing at least one residue of an amine-functional branching agent,
- B) 4 to 20 pbw of at least one graft polymer,
- C) 0 to 30 pbw of at least one member selected from a group consisting of vinyl (co)polymer and polyalkylene terephthalate,
- D) 1 to 15 pbw of at least one member selected from the group consisting of monomeric phosphonic acid esters, monomeric phosphorus acid esters, oligomeric phosphonic acid esters, oligomeric phosphorus acid esters, phosphonate amines and phosphazenes, and
- E) 5 to 15 pbw of talc.

10. The composition of claim 9 wherein said A) is present in an amount of 55 to 83 pbw, and said B) is present in an amount of 5 to 15 pbw, and said C) is present in an amount of 0 to 25 pbw, and said D) is present in an amount of 2 to 13 pbw and said E) is present in an amount of 6 to 12 pbw.

11. The composition of claim 9 wherein said A) is present in an amount of 60 to 78 pbw, and said B) is present in an amount of 6 to 12 pbw, and said C) is present in an amount of 0 to 25 pbw, and said D) is present in an amount of 3 to 11 pbw and said E) is present in an amount of 7 to 12 pbw.

12. The composition of claim 9 wherein said D) conforms structurally to formula (IV), $$R^1-(O)_n-\overset{\overset{O}{\|}}{\underset{\underset{R^2}{|}}{\underset{(O)_n}{P}}}\left[-O-X-O-\overset{\overset{O}{\|}}{\underset{\underset{R^3}{|}}{\underset{(O)_n}{P}}}\right]_q(O)_n-R^4 \quad (IV)$$

in which $R^1$, $R^2$, $R^3$ and $R^4$ mutually independently denote $C_1$ to $C_8$ alkyl, $C_5$ to $C_6$ cycloalkyl, $C_6$ to $C_{20}$ aryl or $C_7$ to $C_{12}$ aralkyl in each case optionally substituted by halogen or alkyl radicals,
- n mutually independently means 0 or 1,
- q means 0 to 30 and
- X denotes a mono- or polynuclear aromatic residue with 6 to 30 C atoms, or a linear or branched aliphatic residue with 2 to 30 C atoms.

13. The composition according to claim 9 wherein the graft polymer (B) is made up of
- B.1) 5 to 95 weight % of the polymerization product of one or more vinyl monomers on
- B.2) 95 to 5 weight-% of one or more graft bases having glass transition temperatures lower than 10° C., said weight % both occurrences relative to the weight of said graft polymer.

14. The composition according to claim 12 wherein X denotes the residue of bisphenol A.

15. A process for the manufacture of the thermoformed article comprising
- (i) obtaining a thermoplastic molding composition in the molten state that contains
  - A) 50 to 85 pbw of at least one member selected from a group consisting of branched aromatic polycarbonate and branched aromatic polyester-carbonate,
  - B) 4 to 20 pbw of at least one graft polymer,
  - C) 0 to 30 pbw of at least one member selected from a group consisting of vinyl (co)polymer and polyalkylene terephthalate,
  - D) 1 to 15 pbw of at least one member selected from the group consisting of monomeric phosphonic acid esters, monomeric phosphorus acid esters, oligomeric phosphonic acid esters, oligomeric phosphorus acid esters, phosphonate amines and phosphazenes, and
  - E) 5 to 15 of talc.
  wherein component A contains at least one residue of an amine-functional branching agent, said composition characterized in that its flexural modulus at room temperature is at least 3000 N/mm$^2$ and that its falling dart energy at break, at −30° C., is at least 40.0 J,
- (ii) extruding the composition to obtain a sheet, and
- (iii) thermoforming the sheet into an article of manufacture.

* * * * *